United States Patent Office 3,140,398
Patented July 7, 1964

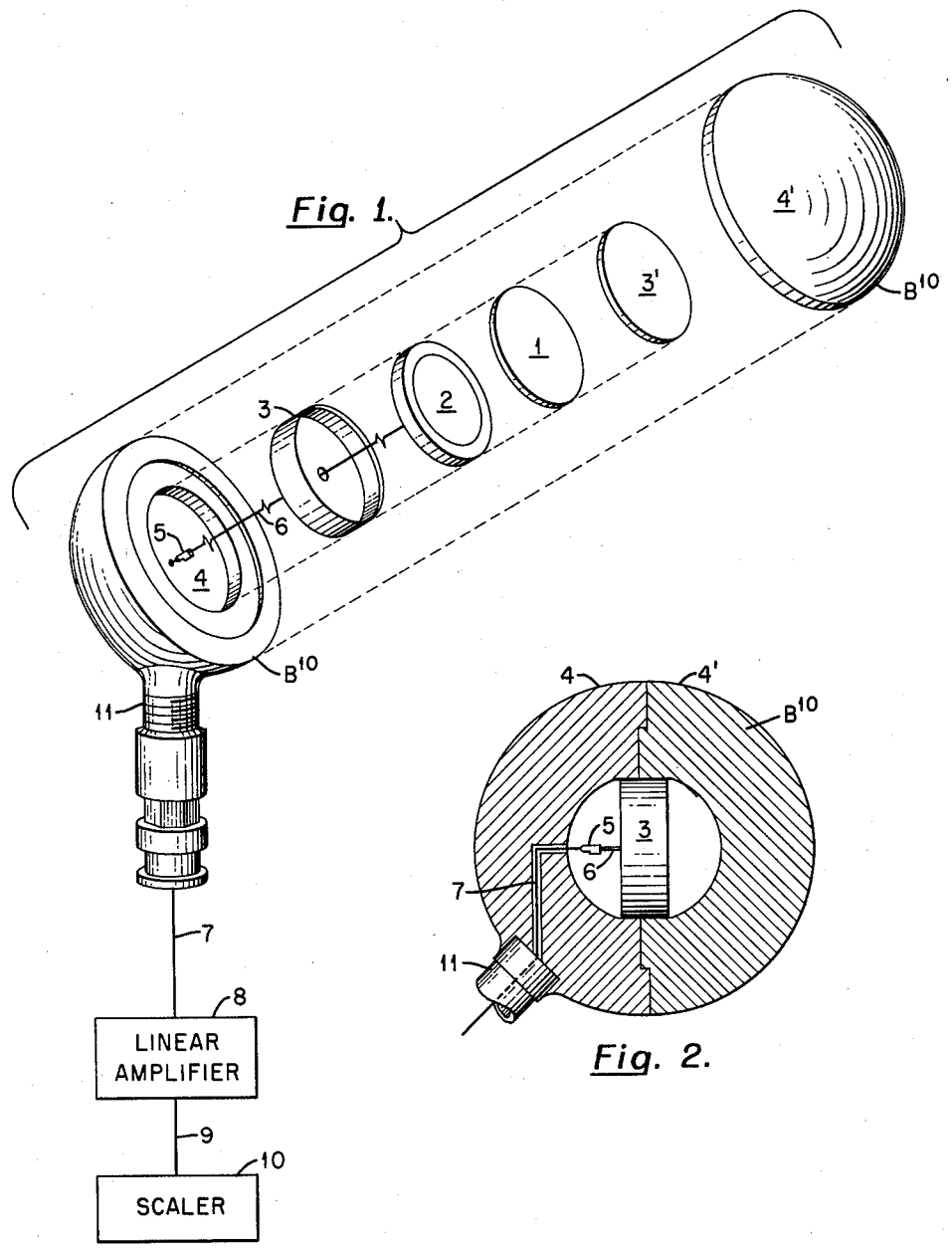

---

3,140,398
NEUTRON DOSIMETER UTILIZING A FISSION FOIL
Paul W. Reinhardt and Francis J. Davis, Oak Ridge, Tenn., assignors to the United States of America as represented by the United States Atomic Energy Commission
Filed Oct. 5, 1962, Ser. No. 228,778
4 Claims. (Cl. 250—83.1)

This invention relates generally to the field of neutron dosimetry and more particularly to a novel means for measuring fast neutron spectra and expressing this measurement directly in terms of dose.

Neutron-responsive threshold detectors are well known in the art of neutron dosimetry. For a more complete discussion of neutron dosimetry and detection means, reference is made to U.S.A.E.C. Report ORNL–2748 (Part A), issued November 16, 1959. Typically, the threshold detector is comprised of a series of neutron activatable materials, each selected to measure the neutron flux above a particular threshold energy and when considered collectively will permit the determination of the neutron spectrum. These threshold detectors, when exposed to a neutron flux, such as results from a critical incident or a nuclear reactor, will become activated and the decay of the fission products may be counted with a suitable counter such as a scintillation counter. From a knowledge of the neutron flux in each energy range of the spectrum, the tissue dose can be calculated.

As can be seen from the above discussion, a threshold detector is best suited for "after-the-fact" determination of dose, e.g., threshold detectors positioned in selected locations where a critical incident may occur can be retrieved after an accident, counted, and tissue dose calculated from the data obtained. However, in certain applications, such as shielding studies, the threshold type detector is not satisfactory since low level doses will not sufficiently activate each of the detectors to permit accurate determination of dose. Also, the threshold detector method of obtaining dose is not a rapid means determination since the device must be removed from its normal location, disassembled, each detector element separately removed and counted, and the total dose calculated by adding up all the separate counts therefrom. Furthermore, threshold type detectors will indicate only the total dose to which they are exposed, i.e., there will be no indication of a continuing reaction at varying power levels.

With a knowledge of the above stated limitations of prior neutron dosimeters, it is a primary object of this invention to provide a device for detecting and indicating directly and continuously fast neutron spectra in terms of dose.

It is another object of this invention to provide a device for detecting and indicating directly fast neutron spectra of a continuing reaction at varying power levels.

These and other objects and advantages of this invention will become apparent upon a consideration of the following detailed specification and the accompanying drawing, wherein:

FIG. 1 is a schematic representation of a neutron dosimeter showing the components thereof, and
FIG. 2 is a sectional view of the device of FIG. 1.

The above objects have been accomplished in the present invention by in situ counting, with a fission detector, of the fission fragments from a composite foil. The foil is uniformly coated with suitable materials for detecting the neutron flux of a typical fission spectrum. The detector and foil are enclosed within suitable thermal neutron shielding for eliminating thermal neutrons. The detector is connected to suitable instrumentation for providing a direct indication of the fast neutron spectrum in terms of dose.

In the drawing FIG. 1 illustrates one embodiment in which the principles of this invention may be carried out. The neutron detector of FIG. 1 comprises a composite foil element 1, a solid state surface barrier detector 2 which may be, for example, a silicon diode or germanium diode, cadmium shield elements 3, 3′, and boron-10 shield elements 4, 4′. The detector 2 is connected by a lead 6 to a jack 5 mounted within the hollow portion of shield 4. The jack 5 is connected by a lead 7, which extends through a member 11 affixed to shield 4, to a linear amplifier 8. The amplifier 8 is connected by a lead 9 to a scaler 10 which records directly and continuously a count in terms of dose of any fission fragments detected by the detector 2 from the fission foil element 1 due to any exposure thereto to fast neutron fluxes. FIG. 2 shows more clearly the position of the shield 3 within the shields 4, 4′. Since the elements 1, 2 and 3′ fit within the shield 3, these elements are not shown in FIG. 2.

The composite foil 1 comprises a nickel disk which may be electroplated with a mixture of uranium-235, neptunium-237 and uranium-238, for example, in the proportions 1.0, 1.14 and 1.99 (milligrams, for example), respectively. The size of the composite foil is not critical. In an area of high neutron density, a small composite foil may be preferred to avoid blocking the counter with a high count rate, whereas in an area of low neutron activity, a larger foil may be desired in order to provide a greater activatable area and thus improve the sensitivity of the dosimeter. As a practical limitation, the lower size limit, for example, should be about equal to the sensitive surface of the semiconductor detector, i.e., approximately 1 cm.$^2$.

It should be noted that the nickel disk of the composite foil may be plated with other threshold detectors than U–235, Np–237 and U–238. Other suitable detectors, for example, are americium-241 (0.7 mev.), thorium (1.3 mev.), protactinium (0.5 mev.) and plutonium (1 kev.). The americium or protactinium could replace the Np-237, thorium could replace the U-238, and plutonium could replace the U-235. However, the U-235, Np-237 and U-238 are preferred because they are more easily plated simultaneously, are less hazardous to handle, and do not have as high an alpha activity as do the other detectors.

The ratio of the preferred foil components (U-235, Np-237 and U-238) as set forth above is based on the following dose equation.

$$D \times 10^9 = 1.0\ N_{\text{U-235}} + 1.4\ N_{\text{Np-237}} + .83\ N_{\text{U-238}}$$

where $N_{\text{U-235}}$, $N_{\text{Np-237}}$ and $N_{\text{U-238}}$ are the neutrons per cm.$^2$ above the thresholds for U-238, Np-237 and U-238, respectively. Each component on the foil is weighted relative to its cross section and coefficient shown in the dose equation. The above proportions are applicable to any size foil or any geometry, which may include a cylinder, for example. It should be noted that these proportions are not critical since there may be a ±5% variation between them, and the detector would still provide a substantially accurate count rate. When other combinations of detectors are used, the proportions must be recalculated to fit the new arrangement in accordance with the appropriate dose equation weighted according to the cross-section, atomic weight and threshold energy.

The detector foil is prepared by simultaneous electrodeposition of the three above preferred elements from an ammonium oxalate solution on one side of the nickel disk only. The method used for this plating is described in Analytical Chemistry of the Manhattan Project, National Nuclear Energy Series VIII–1, pp. 526–531, and U.S. Patent No. 2,790,086, column 3, lines 15–22.

When a silicon diode surface barrier detector 2 is used in

FIG. 1, it may be constructed, for example, in accordance with U.S. application Serial No. 138,533, filed September 15, 1961, or U.S. application Serial No. 89,585, filed February 15, 1961, now abandoned, both having a common assignee with the present application. The deposit side of the nickel disk 1 is placed in contact with the silicon face of the detector 2, and elements 1 and 2 are fitted within the cadmium shield 3 and held therewithin by the cadmium shield 3'. It should be noted that a silicon diode detector is not the only operable detector. Any fission detector would work, but solid state detectors such as germanium or silicon diodes are preferred because of their size. A conventional ionization chamber or proportional counter will work, but in order to keep the size of the thermal neutron shield to a practical limit, small detectors are more desirable.

The linear amplifier 8 may be any suitable unit. An example of one such linear amplifier is described in Review of Scientific Instruments, vol. 18, No. 10, pp. 703–705, October 1947. The scaler 10 which records the count in terms of dose may also be any suitable commercial unit. An example of one such scaler is the scaler, Model No. N–240, made by Hammer Electronic Company, Inc., Princeton, New Jersey.

The thicknesses of the cadmium shields 3, 3' may be about 0.025 inch, for example, and the thicknesses of the boron-10 shields 4, 4' may be about 1 cm. with a density of about 1.65 grams per cubic centimeter, for example. These dimensions are not critical, however. It should be noted that this invention is not limited to thermal neutron shields of boron-10 and cadmium alone. Other materials such as natural boron and lithium-6 could also be used. The cadmium secondary shield is not absolutely essential and could be omitted, if desired, and the dosimeter would still provide a fairly accurate count rate. However, use of a secondary shield is preferred since it shields the composite fission foil from fast neutrons which are moderated to thermal neutrons by the B-10 shield.

In operation, when the composite fission foil 1 is struck by fast neutrons (thermal neutrons being shielded by the B-10 and cadmium shields) the resultant fission fragments will be detected by the silicon diode detector 2. The output of detector 2 will be amplified by the linear amplifier 8, and the count will be recorded by the scaler 10 in terms of dose. The U-235 will detect the fast neutron fluxes above 1 kev., the Np-237 will detect the fast neutron fluxes above 0.75 mev., and the U-238 will detect the fast neutron fluxes above 1.5 mev. The scaler 10 records the total fission fragments from all of these elements directly and continuously such that an indication can be provided of a continuing reaction at varying power levels. Thus, the detector of this invention may be used in shielding and depth dose studies in connection with experimental nuclear reactors. Since there is no need for a high voltage amplifier to receive the signals from the detector 2, the device can be packaged for easy portability, if desired.

The neutron dosimeter described above is calibrated by exposing it to a known neutron flux. It has been determined that about 1500 counts on the dosimeter is equivalent to one rad.

This invention has been described by way of illustration rather than limitation and it should be apparent that this invention is equally applicable in fields other than those described.

What is claimed is:

1. A neutron dosimeter for measuring and indicating directly fast neutron spectra in terms of dose, comprising a fission foil coated on one side with a mixture selected from the group consisting of U-235, Np-237, U-238, Pu-239, Am-241, Pa and Th; a fission detector being in contact with the deposit side of said foil; a thermal neutron shield selected from the group consisting of boron-10, natural boron, cadmium and lithium-6, said shield enclosing said foil and detector; a linear amplifier; a pulse counter; and means for connecting said detector to said amplifier and for connecting said amplifier to said counter, said counter providing a direct and continuous measurement of fast neutron spectra when said dosimeter is exposed to a radiation source.

2. A neutron dosimeter for measuring and indicating directly fast neutron spectra in terms of dose, comprising a fission foil which includes a metallic disk electroplated on one side with a mixture of uranium-235, neptunium-237 and uranium-238; a silicon diode detector being in contact with the deposit side of said disk; a cadmium shield enclosing said disk and detector; a boron-10 shield enclosing said cadmium shielded disk and detector; a linear amplifier; a pulse counter; and means for connecting said detector to said amplifier and for connecting said amplifier to said counter, said counter providing a direct and continuous measurement of the fast neutron spectra when said dosimeter is exposed to a radiation source.

3. The dosimeter set forth in claim 2, wherein said mixture of uranium-235, neptunium-237 and uranium-238 are in the proportions 1.0, 1.14 and 1.99, respectively.

4. The dosimeter set forth in claim 3, wherein said disk has an area of 1.0 cm.², said cadmium shield has a thickness of 0.025 inch, and said boron shield is spherical and has a thickness of 1 cm. with a density of 1.65 grams per cubic centimeter.

References Cited in the file of this patent
UNITED STATES PATENTS

| | | |
|---|---|---|
| 2,994,773 | Sternglass | Aug. 1, 1961 |
| 3,076,895 | Baldwin | Feb. 5, 1963 |